May 18, 1954     J. HALTENBERGER     2,678,680
MOTOR VEHICLE INDEPENDENT SEAT ADJUSTMENT
Filed May 23, 1950                          2 Sheets-Sheet 1
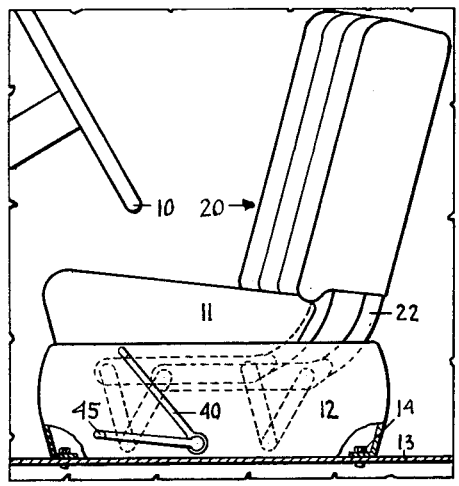
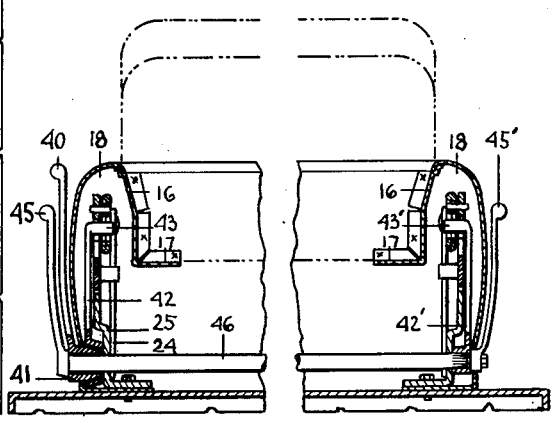
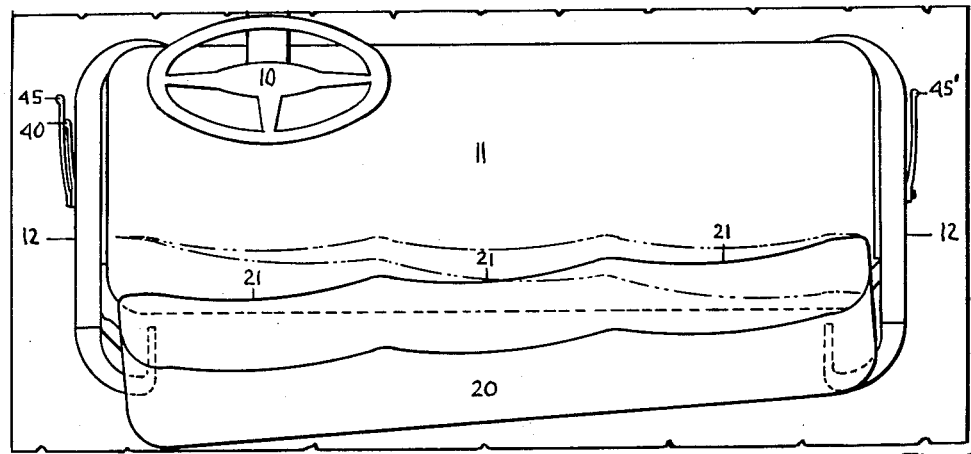
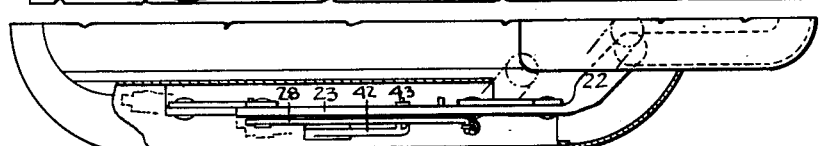
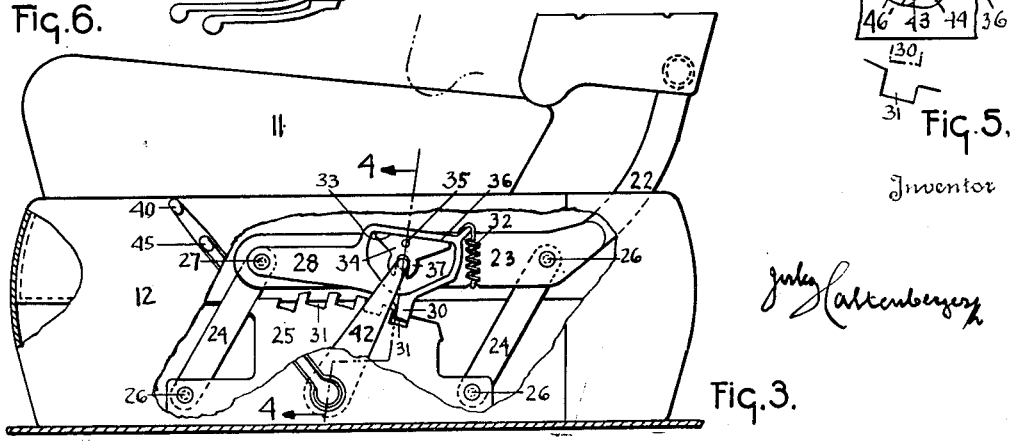
Inventor
Jules Haltenberger May 18, 1954 J. HALTENBERGER 2,678,680
MOTOR VEHICLE INDEPENDENT SEAT ADJUSTMENT
Filed May 23, 1950 2 Sheets-Sheet 2
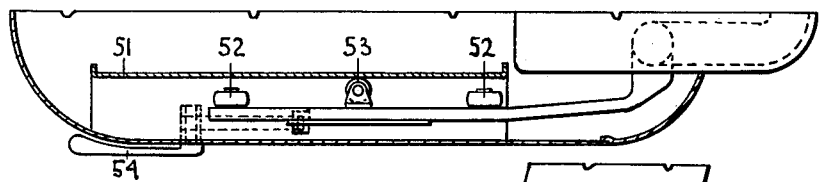
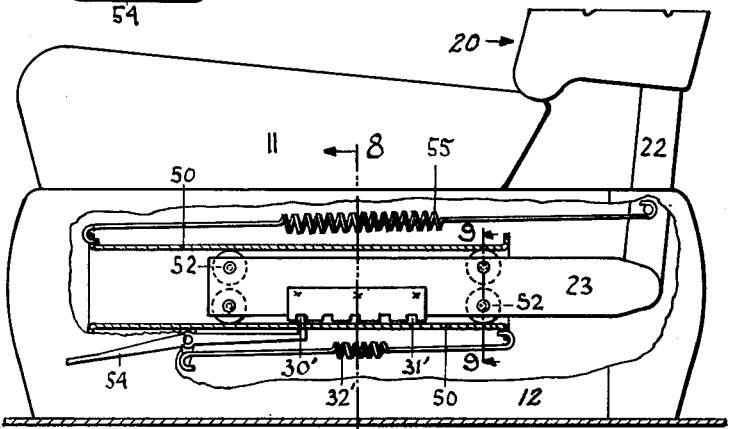
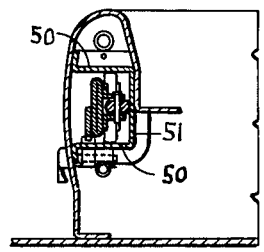
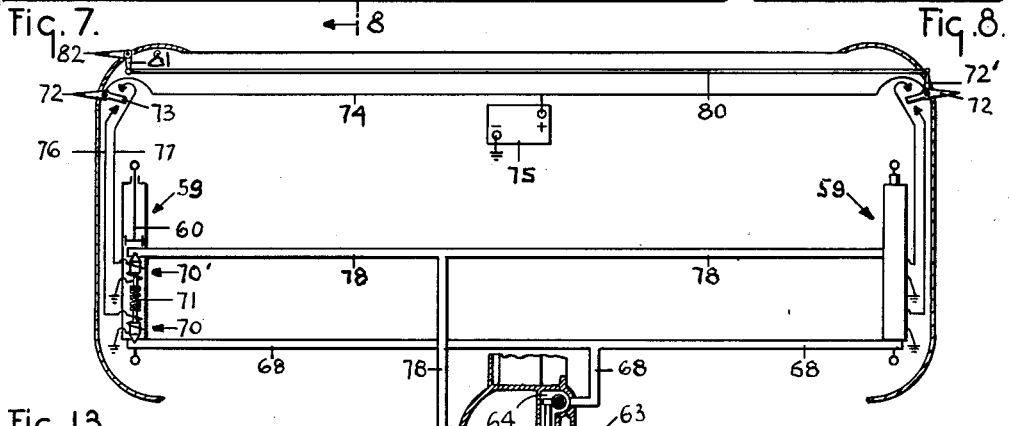
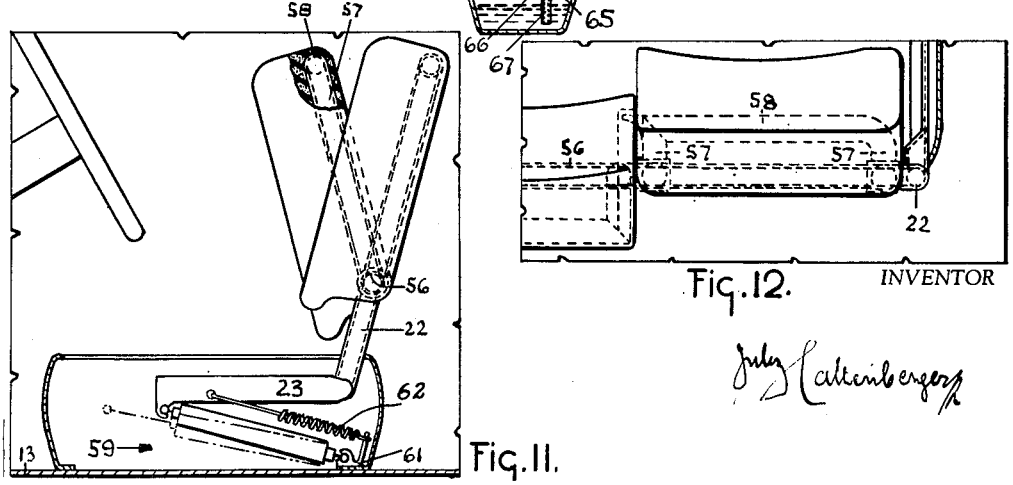
INVENTOR
Jules Haltenberger Patented May 18, 1954

2,678,680

UNITED STATES PATENT OFFICE 2,678,680

MOTOR VEHICLE INDEPENDENT SEAT ADJUSTMENT

Jules Haltenberger, Rancho Santa Fe, Calif.

Application May 23, 1950, Serial No. 163,713

10 Claims. (Cl. 155—5)

The present invention relates to my co-pending patent applications Serial No. 23,152, filed on April 26, 1948, for Automobile Front Seat Adjustment; Serial No. 64,208, filed on December 8, 1948, for Motor Vehicle Independent Seat Control; and Serial No. 145,857, filed on February 23, 1950, for Automobile Electric Independent Seat Adjustment.

It is known, that women, when compared to men of the same total height, have materially lower positioned hip joints than men, and correspondingly, have a shorter space between their hip and knee joints. All the automobile seats and seat adjustments now manufactured, that applicant is aware of, fail to provide a desired lesser seat depth for a woman, or for people of short stature.

It is the object of my invention, to provide a full length, three or four passenger unitary front seat with a detachable full length backrest, arranged for forward and rearward adjustment, and in the preferred form, for independent adjustment forwardly and rearwardly of each of the backrest ends.

A further object is an independent seat backrest adjustment arranged for operation by the usual oil pressure of the associated engine.

Further objects will appear as the description proceeds.

Referring to the drawings:

Fig. 1 is a side elevation of an automobile unitary front seat having a linkage supported adjustable back, illustrating the driver's end of back adjusted to the rearward position, and the passenger end, adjusted to a forward position; Fig. 2 is a plan view of the showing of Fig. 1; Fig. 3 is a fragmentary hollow end structure, similar to Fig. 1, with some parts broken away, here shown in a larger scale and with both seat back rest ends in the rearward position; Fig. 4 is a section substantially on line 4—4 of Fig. 3; Fig. 5 shows in a larger scale a detail of Fig. 3; Fig. 6 is a fragmentary plan view of Fig. 3; Fig. 7 is similar to Fig. 3, here showing a modification with roller supported adjustable back; Fig. 8 is a section substantially on line 8—8 of Fig. 7; Fig. 9 is a fragmentary section substantially on line 9—9 of Fig. 7; Fig. 10 is a plan view of Fig. 7; Fig. 11 is similar to Fig. 1, showing another modification in which the support is omitted and the seat back adjusting hydraulic jack is illustrated and also the forward tilting of the seat back flap for egress from two door sedans is shown; Fig. 12 is a plan view of a part of Fig. 11; Fig. 13 is a schematical powerflow and electrical control and wiring diagram of the back ends operating hydraulic jacks.

Referring to Figs. 1 to 6 inclusive, it will be seen, that under a steering wheel 10, a full width one piece or unitary front seat cushion 11 is supported by a pair of hollow seat end structures, having curved end walls 12, which seat end structures are secured to the floor 13, as by bolts 14. The top of wall 12 is formed into a substantially level portion, where a front cushion support having a side wall 16 and tray 17 is secured as by spot welding, whereby walls 12 and 16 form a longitudinal tunnel space 18, three quarter way surrounded by the seat base structure.

The seat is provided with a full length one piece or unitary, backrest generally designated at 20, in the preferred form, and as here shown the padding has form fitting recesses 21. The backrest is formed on a usual tubular frame construction having exposed tubular supporting legs 22, terminating in substantially horizontal flattened portions, forming protruding end structures or arms 23. Arms 23 adjustably support the back 20, by slightly twistable operating interconnecting guide means links 24, are operatively connected to base mounting plate 25 by hinge rivets 26, and to arm 23 by a similar rivet 26, and a different hinge rivet 27. Rivet 27 besides operatively connecting a link and the arm, operatively supports a latch 28 having a seat locking tongue 30, normally, in engagement with one of the seat locking slots 31, which engagement is urged by latch spring 32.

As is clear from Figs. 3 and 5, the latch 28 is provided with a large opening having a straight inner wall 33 normally in full surface engagement with a release member 34, arranged to rock on pin 35 and having a top wall 36, and operating fork 37.

The driver's end of backrest adjustment is performed by a manually accessible lever 40, having a hub 41, and thereto spline connected inner lever 42, terminating in an operating pin 43. As shown on the drawings, pin 43 operates in a fork 37 formed in member 34, and passes through an opening in arm 23 arranged to serve as an action controlling gate 44. In operation, the initial motion of lever 40, that corresponds to the travel of the operating pin from the central position to the gate wall contacting position (in Fig. 5, from 43 to 46') is used to disengage the locking tongue 30 from the associated locking slot 31. The lever movement thereafter is free to adjust the backrest. Upon release of the manually operated lever the latch spring will lock the backrest in its new position, or nearest latch station respectively. In the other direction the operation of latch release and backrest adjustment is identical.

The backrest at the passenger end of the front seat, is adjusted and controlled in a manner described in connection with the driver's end of seat. To permit the driver to adjust the passenger end of backrest, a manual lever 45, integral with interconnecting shaft 46, is arranged to move a spline connected inner lever 42' terminating in pin 43'.

When the driver operates lever 40, he will operate the adjustment of the backrest at the driver's end, moving the end transversely, towards or away from the seat base structure. When he operates the lever 45, the passenger end of the backrest will be adjusted. Whenever the driver operates both levers 40 and 45 in unison, the backrest will move forwardly and backwardly at both ends.

When the passenger desires to adjust her own backrest, lever 45' is provided, this lever being secured to the passenger end of the interconnecting shaft 46.

By securing both inner levers 42 to the interconnecting shaft 46, and with a manual lever at the driver's end (not shown) a simple parallelly adjustable backrest is arrived at.

When desired I may provide the interconnecting adjustable means including rolling elements, as illustrated in Figs. 7, 8, 9 and 10.

Here, both seat supporting walls 12, at their inner sides, as by spot welding, are provided with a rectangular tunnel, formed by upper and lower walls 50 and inner wall 51. The seat backrest generally indicated at 20 is built on a usual tubular frame structure having exposed legs 22 terminating in flattened protruding end structure or arms 23. Here, as is clear from the drawings, the arms are provided with four independent guide means rollers 52 operatively disposed in the guideway between the upper and lower tunnel walls 50, and with an inner roller 53 in contact with inner tunnel wall 51. These rolling elements might be equipped with roller skate type ball bearings (not shown).

These rollers will hold the backrest easily adjustable and in rattle proof relation. Arm 23 is provided with adjustment locking slots 31' arranged to engage locking tongue 30' by spring 32'. The adjustment lock is releasable by a manual lever 54.

This roller supported backrest, responds to the least pressure exerted by the back of the driver or passenger. To facilitate the forward adjustment applicant provides a backrest forward pressure spring 55, interconnecting the movable leg and stationary tunnel end.

A full width unitary seat reaching from one front door to the opposite front door and an associated unitary backrest supported by adjustable end arms might be provided with a movable backrest flap, to increase the ingress and egress space, when serving in a two door automobile. This is illustrated in Figs. 11 and 12. Here legs 22 terminate in arms 23, and the legs are interconnected by a tubular structure 56 arranged to support in hinged action a generally U-shaped tubular frame structure formed of generally vertical tubes 57, and an interconnecting generally horizontal top tube 58. This U-shaped structure and associated structures form the frame for the passenger end seat backrest padding. Inasmuch as the two protruding end structures or arms support and control the backrest if with or without exit flap it shall be referred to as unitary.

Many automobiles are provided with a 220 lbs. expensive independent hydraulic pressure pump system for the adjustment of the front seat.

In this embodiment, only the seat backrest is adjusted, therefore a much smaller hydraulic pressure device is needed. Using for this operation the usual 30 lbs. engine oil pressure, is schematically illustrated in Figs. 11 and 13.

Here arms 23 are guided in any desired manner (not shown) and the forward movement of the driver's end of backrest is accomplished by a hydraulic jack device, generally indicated at 59 having a piston and piston rod assembly 60. As shown in Fig. 11, the jack cylinder is anchored to floor 13, as by bracket 61, and the piston rod is operatively connected to arm 23. Jack 59 (to be described) in conformity with established manufacturing practice, is an inexpensive, power extending one way type jack, therefor, for the backrest return, a heavy return spring 62 is anchored in between the arm and bracket 61.

As indicated in Fig. 13, an engine generally designated at 63, is provided with a usual cam shaft tunnel 64, where oil pressure is maintained by a usual shaft driven gear pump member 65 and associated idling gear pump member 66, both arranged to be served by oil suction inlet pipe 67. From the tunnel an oil pressure pipe 68 guides the oil while under pressure to each of the jacks 59, where a solenoid operated valve, generally indicated at 70 is held in oil pressure inlet passage closing position by spring 71.

The seat end on the driver's side is provided with a two-way electrical switch, having an operating lever 72 and thereto connected contact arm 73, this arm is charged with positive current through wire 74 by electric battery 75.

When the driver moves lever 72 forward, arm 73 moving backwardly energizes through wire 76 the solenoid and valve 70, the valve thereby moves off its seat, and admits the pressurized oil, therefore, the driver's end of backrest moves forwardly.

When the driver moves the operating lever rearwardly, through wire 77 energizes a solenoid and valve generally at 70', the valve off its seat through the pressure of return spring 62 will allow the oil to escape from under the piston, through return pipe 78 emptying in engine 63, and by this operation, the driver's end of backrest moves rearwardly.

The passenger end of the backrest hydraulic adjustment is the duplicate of the adjustment and control described in connection with the driver's end. Applicant, however, provides on the passenger's jack operating lever 72 a therewith integral addition lever 72' to connect with a push and pull rod 80, in turn connected to a lever 81 a part of an operating lever 82.

When the driver operates levers 72 and 82 uni-directionally the backrest will move forwardly and rearwardly in parallel planes. When operating lever 72 alone the driver's end of seat backrest will move. Whenever operating lever 82 alone, the passenger end of backrest will move, or the passenger adjusts her own backrest by operating the lever 72 disposed on her side.

Applicant here proposes a simple and least expensive driving or riding space adjustment, conveniencing the tall and the short and with special considerations of the female of the species. The unitary seat serves without any loss of useful seat width and the unitary backrest serves with or without an exit flap.

For certain applications an automobile might be provided with a present day usual longitudinal parallel motion seat adjustment and a therewith associated independent backrest might be provided with an independent backrest adjustment (not shown).

While I have herein shown and described only certain specific embodiments of my invention and have suggested only certain possible modifications, it will be appreciated that many changes and variations can be made to suit particular conditions and embodiments of use, without departing from the spirit and scope of my invention.

What applicant claims as his invention:

1. A vehicle seat having an adjustable backrest comprising, a hollow seat base, a unitary backrest extending longitudinally of said hollow seat base, the lower portion of said backrest having spaced arms disposed in said hollow seat base, means to swingably support said arms relative to said hollow seat base whereby the upper portion of said backrest may be moved transversely over said hollow seat base, and means at each end of the hollow seat base to selectively control the positions of said arms relative to said hollow seat base.

2. A vehicle seat having an adjustable backrest comprising, a seat portion extending transversely within a vehicle, supporting means at each end of the seat, a unitary backrest extending across said seat, arms supporting said backrest, bearing means mounting said arms on the vehicle structure for independent forward and rearward movement with respect to the seat, and manually controlled means selectively moving said arms.

3. A vehicle seat having an adjustable backrest comprising, a seat portion extending transversely within a vehicle, supporting means at each end of the seat, a unitary backrest extending across said seat, arms supporting said backrest, bearing means mounting said arms on the vehicle structure for independent forward and rearward movement with respect to the seat, manually controlled means selectively moving said arms, and means to lock said arms independently to thus maintain desired adjusted positions of the two ends of the backrest.

4. A vehicle seat having an adjustable backrest comprising, a seat base, a unitary backrest extending across said seat, arms at the ends of said backrest, links connecting said arms with the base structure of the seat for forward and rearward adjustment, and independently actuatable means to move said arms selectively forwardly and rearwardly to correspondingly selectively adjust the ends of the backrest with respect to the seat.

5. A vehicle seat having an adjustable backrest comprising, a seat supporting base structure, an elongated seat extending across said supporting base, a unitary backrest extending longitudinally over the elongated seat, guide means carried by the supporting base at each end of the seat, arms at the ends of said backrest movable forwardly and rearwardly in said guides, and manually controlled means selectively operable to move said arms selectively forwardly and rearwardly to thus adjust the position of the backrest with respect to the seat.

6. A vehicle seat having an adjustable backrest comprising, a seat supporting base structure, an elongated seat extending across said supporting base, a unitary backrest extending longitudinally over the elongated seat, guide means carried by the supporting base at each end of the seat, arms at the ends of said backrest movably forwardly and rearwardly in said guides, manually controlled means selectively operable to move said arms selectively forwardly and rearwardly to thus adjust the position of the backrest with respect to the seat, and manually actuatable means at one end of the seat to move said arms simultaneously rearward and forwardly to thus accomplish unitary adjustment of the backrest forwardly and rearwardly.

7. A vehicle seat having an adjustable backrest comprising, an elongated seat disposed transversely within a vehicle to accommodate at least two persons, a unitary backrest extending across the seat and thus disposed transversely within the vehicle, arms supporting said unitary backrest at the two ends thereof independently movably mounted in conjunction with the seat structure for selective control of the positions of the two ends of the backrest with respect to the seat, operating means connected with said arms independently operable for selective adjustment of the two ends of the backrest, locking means engageable to retain each end of the backrest in the selectively adjusted position, and lock releasing means associated with the means selectively moving the ends of the backrest operating to release the locking means before initiating adjusting movement of an end of the backrest.

8. A vehicle seat having an adjustable backrest comprising, a supporting base structure, an elongated seat mounted on the base structure, a unitary backrest extending longitudinally of said seat, arms at each end of the backrest mounted for independent movement and adjustment on the base structure, power means to move said arms selectively and thus control the position of the ends of the backrest relative to the seat, and control means for said power means.

9. The invention disclosed in claim 8, wherein the power means is operated by the vehicle engine lubricant's pressure.

10. A chair having an adjustable backrest, comprising a seat base structure, an elongated backrest structure extending longitudinally of said base, arms at each end of said backrest structure mounted for selective adjustment on said base, and means supporting said arms on said base at its ends whereby either end of said backrest structure may be selectively moved towards or away from the front end of said base, and means at each end of said base to selectively control the position of said arms relative to said seat base structure.

References Cited in the file of this patent

UNITED STATES PATENTS

| Number | Name | Date |
|---|---|---|
| 592,247 | Gilfillan | Oct. 26, 1897 |
| 1,140,097 | Anger | May 18, 1915 |
| 1,361,178 | Pipp | Dec. 7, 1920 |
| 1,443,479 | Lambert | Jan. 30, 1923 |
| 1,685,770 | Bowen | Oct. 2, 1928 |
| 1,770,826 | Allgeyer | July 15, 1930 |
| 1,997,486 | Hallowell | Apr. 9, 1935 |
| 2,100,597 | Pickle | Nov. 30, 1937 |
| 2,283,485 | Beck | May 19, 1942 |

FOREIGN PATENTS

| Number | Country | Date |
|---|---|---|
| 246,830 | Great Britain | Jan. 13, 1927 |